(12) United States Patent
Franceschini et al.

(10) Patent No.: US 9,407,400 B2
(45) Date of Patent: Aug. 2, 2016

(54) METHOD OF TRANSMITTING DIGITAL SIGNALS, CORRESPONDING TRANSMISSION SYSTEM, SIGNAL AND COMPUTER PROGRAM PRODUCT THEREFOR

(75) Inventors: Daniele Franceschini, Turin (IT); Bruno Melis, Turin (IT); Alfredo Ruscitto, Turin (IT)

(73) Assignee: TELECOM ITALIA S.P.A., Milan (IT)

( * ) Notice: Subject to any disclaimer, the term of this patent is extended or adjusted under 35 U.S.C. 154(b) by 12 days.

(21) Appl. No.: 13/121,641

(22) PCT Filed: Sep. 30, 2008

(86) PCT No.: PCT/EP2008/008290
§ 371 (c)(1),
(2), (4) Date: Mar. 29, 2011

(87) PCT Pub. No.: WO2010/037405
PCT Pub. Date: Apr. 8, 2010

(65) Prior Publication Data
US 2011/0176532 A1 Jul. 21, 2011

(51) Int. Cl.
*H04L 5/00* (2006.01)
*H04L 27/26* (2006.01)

(52) U.S. Cl.
CPC .............. *H04L 5/0005* (2013.01); *H04L 5/006* (2013.01); *H04L 5/0062* (2013.01); *H04L 5/0085* (2013.01); *H04L 5/0087* (2013.01); *H04L 27/2626* (2013.01)

(58) Field of Classification Search
USPC ................................................. 375/130–135
See application file for complete search history.

(56) References Cited

U.S. PATENT DOCUMENTS

| 2004/0131007 | A1* | 7/2004 | Smee et al. ................... 370/208 |
| 2007/0081604 | A1* | 4/2007 | Khan ...................... H04L 5/023 375/261 |
| 2007/0165733 | A1* | 7/2007 | Murakami et al. ............ 375/260 |
| 2007/0291634 | A1* | 12/2007 | Kwon ................. H04L 27/2601 370/208 |
| 2008/0043812 | A1* | 2/2008 | Moffatt ......................... 375/133 |
| 2008/0284509 | A1* | 11/2008 | Kim et al. ................. 330/124 R |
| 2010/0046650 | A1* | 2/2010 | Jongren ............... H04B 7/0413 375/260 |
| 2010/0128811 | A1* | 5/2010 | Hassler ............... H04L 27/2623 375/295 |
| 2011/0002233 | A1* | 1/2011 | Hammarwall ........ H04L 1/0034 370/252 |
| 2011/0170449 | A1* | 7/2011 | Qian et al. .................... 370/252 |

FOREIGN PATENT DOCUMENTS

EP      1 883 258 A1    1/2008

OTHER PUBLICATIONS

Berthold et al.; "Guidelines for Designing OFDM Overlay Systems", IEEE, pp. 626-629, (2005).

(Continued)

*Primary Examiner* — Redentor Pasia
(74) *Attorney, Agent, or Firm* — Finnegan, Henderson, Farabow, Garrett & Dunner, L.L.P.

(57) ABSTRACT

Digital signals are transmitted over a communication channel having a given bandwidth, by simultaneously transmitting: one or more Spread Spectrum signals, such as, Code Division Multiple Access signals, wherein the spectrum of the Spread Spectrum signals exhibits roll-off transition bands at the boundaries of the spectrum, and one or more multi-carrier transmission signals, such as, Orthogonal Frequency Division Multiplexing signals, which are transmitted over the transition bands of the Spread Spectrum signals.

15 Claims, 7 Drawing Sheets

(56) References Cited

OTHER PUBLICATIONS

Ballon et al.; "Flexible Spectrum Business Models for the Mobile Industry", IEEE, 7$^{th}$ International Conference on Mobile Business, pp. 86-94, (2008).

International Search Report from the European Patent Office for International Application No. PCT/EP2008/008290, mailing date Jul. 21, 2009.

Technical Report from University of Kansas; Rajbanshi, Rakesh; "OFDM-Based Cognitive Radio for DSA Networks;" Sep. 2007, p. 32-33.

* cited by examiner

| Operating Band | UL Frequencies UE transmit, Node B receive | DL frequencies UE receive, Node B transmit |
|---|---|---|
| I | 1920 - 1980 MHz | 2110 -2170 MHz |
| II | 1850 -1910 MHz | 1930 -1990 MHz |
| III | 1710-1785 MHz | 1805-1880 MHz |
| IV | 1710-1755 MHz | 2110-2155 MHz |
| V | 824 - 849 MHz | 869-894 MHz |
| VI | 830-840 MHz | 875-885 MHz |
| VII | 2500 - 2570 MHz | 2620 - 2690 MHz |
| VIII | 880 - 915 MHz | 925 - 960 MHz |
| IX | 1749.9 - 1784.9 MHz | 1844.9 - 1879.9 MHz |
| X | 1710-1770 MHz | 2110-2170 MHz |
| XI | 1427.9 - 1452.9 MHz | 1475.9 - 1500.9 MHz |
| XII | 698 - 716 MHz | 728 - 746 MHz |
| XIII | 777 - 787 MHz | 746 - 756 MHz |
| XIV | 788 - 798 MHz | 758 - 768 MHz |

METHOD OF TRANSMITTING DIGITAL SIGNALS, CORRESPONDING TRANSMISSION SYSTEM, SIGNAL AND COMPUTER PROGRAM PRODUCT THEREFOR

CROSS REFERENCE TO RELATED APPLICATION

This application is a national phase application based on PCT/EP2008/008290, filed Sep. 30, 2008, the content of which is incorporated herein by reference.

FIELD OF THE INVENTION

This disclosure relates to communication technology.
Specifically, this disclosure concerns techniques for sharing a given frequency spectrum.

DESCRIPTION OF THE RELATED ART

Third generation communication systems based on Code Division Multiple Access (CDMA) techniques have been widely deployed worldwide by cellular operators for the efficient provision of packet data services. For example, High Speed Downlink Packet Access (HSDPA) and High Speed Uplink Packet Access (HSUPA) represent a further evolution of third generation communication systems to improve the throughput capabilities of the Universal Mobile Telecommunications System (UMTS) in downlink and uplink, respectively.

High Speed Downlink Packet Access was standardized in 2002, as a part of Third Generation Partnership Project (3GPP) Release 5 specifications, with the purpose of improving spectral efficiency in downlink packet data transmission. Basically, HSDPA introduces a new common High Speed Downlink Shared Channel (HS-DSCH), which is shared by all the users in a particular sector. In addition, HSDPA introduces certain mechanisms that enable high speed packet data transmission at the physical layer such as e.g. a short Transmission Time Interval (TTI) of 2 ms, Adaptive Modulation and Coding (AMC), fast retransmission based on Hybrid Automatic Repeat request (H-ARQ) techniques and a centralized scheduler located in the Node B (i.e. the base station).

High Speed Uplink Packet Access was standardized in 2005 as part of the 3GPP Release 6 specifications. HSUPA introduces in the physical layer features that are similar to those of HSDPA in order to improve the spectral efficiency of the radio interface for uplink packet data transmission. These techniques include a shorter TTI of 2 ms, the adoption of H-ARQ techniques at physical layer, adaptive modulation and coding, and a centralized scheduling algorithm at the Node B.

High Speed Packet Access (HSPA) systems may operate with HSDPA in downlink and/or HSUPA in uplink. HSPA networks compliant with 3GPP Release 6 specifications provide a peak throughput of 14.4 Mbit/s in downlink and 5.76 Mbit/s in uplink. With the introduction of multiple antenna technologies (MIMO) and higher order modulations (HOM), as specified e.g. in the 3GPP Release 7 specifications, the peak throughput may increase to 28.8 Mbit/s in downlink and to 11.4 Mbit/s in uplink. In the 3GPP Release 8 specification, the peak throughput may reach 40 Mbit/s if MIMO and HOM are jointly used in downlink.

Conventional HSPA networks use Frequency Division Duplexing (FDD), wherein the downlink and uplink are transmitted in different frequency bands. For example, in the case of the operating band I, the downlink frequencies may be allocated in the 2110-2170 MHz band, while the uplink frequencies may be allocated in the 1920-1980 MHz band. The downlink and uplink bands may have thus an extension of 60 MHz and may be spaced apart by 190 MHz.

Typically, the nominal channel width of an HSPA system is equal to 5 MHz, which means that, for example, up to 12 HSPA carriers may be allocated to licensed operators in the operating band I. A list of frequency bands, in which the HSPA technology may operate, is provided in FIG. 1. However, deployment in other frequency bands is feasible.

HSPA networks provide a substantial throughput improvement for packet data transmission compared to earlier UMTS releases. However, the evolution of HSPA networks is constrained by requirements of compatibility with previous releases of the UMTS specifications.

For that reason, the 3GPP committee started in November 2004 a study on a new radio-access technology for packet data transmission, which provides higher data rates with lower latency. This new technology has been denominated Evolved UMTS Terrestrial Radio Access Network (E-UTRAN) or is also known as UMTS Long Term Evolution (LTE). The LTE technology, both in terms of radio interface and also in term of an Evolved Packet Core network (EPC), is currently under standardization within the framework of the 3GPP Release 8 specifications.

The 3GPP committee has set promising performance targets for LTE that include e.g. peak data rates well above 100 Mbit/s in downlink and 50 Mbit/s in uplink over a 20 MHz channel bandwidth. The spectral efficiency of LTE networks is expected to be in the range of 2 to 4 times the spectral efficiency of Release 6 HSPA networks. Expectedly, the LTE radio interface will be optimized for low mobile speeds from 0 to 15 km/h, while higher speeds between 15 and 120 km/h are still supported with high performance. The system is expected to work with reduced performance even at speeds from 120 km/h to 350 km/h (or even up to 500 km/h depending on the frequency band).

A characteristic of the LTE system is flexibility in the spectrum usage achieved by supporting a number of different channel bandwidths (BW) including e.g. 1.4 MHz, 3.0 MHz, 5 MHz, 10 MHz, 15 MHz and 20 MHz. Moreover, the operation in paired and unpaired spectrum may be supported with Frequency Division Duplexing (FDD) or Time Division Duplexing (TDD).

In downlink, spectrum flexibility is obtained by using Scalable Orthogonal Frequency Division Multiple Access (S-OFDMA) as the modulation and multiple access technique. Scalable-OFDMA is currently based on a fixed subcarrier spacing equal to 15 kHz, independent of the channel bandwidth, while the number of subcarriers is proportional to the channel bandwidth.

In uplink, spectrum flexibility is obtained by using Single Carrier Frequency Division Multiple Access (SC-FDMA) as the multiple access technique.

SC-FDMA exhibits a lower Peak to Average Power Ratio (PAPR) when compared to classical Orthogonal Frequency Division Multiple Access (OFDM). A lower PAPR may be important in the uplink, because the cost and the power efficiency of the Power Amplifier in the User Equipment (UE) is usually critical. In addition, SC-FDMA exhibits the same degree of flexibility in frequency resource allocation of a multi-carrier system.

The introduction of a completely different radio access technology, such as LTE, might be a burdensome step for cellular network operators. For example, HSPA and LTE systems are expected to operate on separate frequency bands that are spaced apart depending on the spectrum resources that will be licensed for the LTE system by the regulatory bodies.

Moreover, while the two systems may be co-located on the same site, it is likely that they will be employed as independent radio access technologies with separate radio equipments.

FIG. 2 is representative of an exemplary scenario, wherein a cellular operator owns two pairs of 5 MHz UMTS/HSPA carriers located in one of the bands listed in FIG. 1. Specifically, the cellular operator may have available a first HSPA pair of carriers $HSPA_{U1}$ and $HSPA_{U2}$ for uplink and a second pair of carriers $HSPA_{D1}$ and $HSPA_{D2}$ for downlink. In the exemplary scenario of FIG. 2, these carriers may be managed by a single UMTS/HSPA Node B 10.

In the near future, after the completion of the standardization process, the cellular operators may then deploy the new LTE radio access technology. For example, possible candidate frequency bands that could be licensed for the LTE operation are located in a range from 2.5 GHz to 2.69 GHz. LTE may be deployed potentially in all frequency bands identified by the Word Radio Conference (WRC) for International Mobile Telecommunications-2000 (IMT-2000) systems, because the LTE technology forms part of the IMT-2000 family of radio access technologies. In particular, the bands identified by the WRC conference include the 900 MHz and 1800 MHz band used currently by the GSM/EDGE Radio Access Network (GERAN) and the 2 GHz band used by the UMTS/HSPA system.

In the example shown in FIG. 2, the cellular operator may thus have an additional 10 MHz band $LTE_U$ for uplink and a 10 MHz band $LTE_D$ for downlink, which are managed by an Evolved UTRAN Node B 20.

The risks related to the adoption of a new OFDMA based radio access technology in addition to already deployed HSPA networks should be supported by a positive trade-off between expected revenues and additional costs. Thus, in order to reduce the initial costs for an operator, the coexistence of HSPA and LTE technology in the same frequency band, without requiring e.g. the immediate acquisition of new frequency bands, would be a definite asset.

Various techniques are known in the art for operating different communication systems in the same frequency band.

A first type of techniques is based on spectral measurements for determining free frequency resources. For example, Ulrich Berthold et al. "Guidelines for Designing OFDM Overlay Systems", Universität Karlsruhe (TH), Germany, IEEE 2005, describes an overlay scenario where two different communication systems operate independently in the same frequency band. The primary licensed system (LS) has privileged access to the spectrum while the overlay system (OS) utilizes the unused parts of the spectrum. Due to the priority of the licensed system (LS), the overlay system dynamically adapts its spectral allocation and hence constantly monitor the licensed system's access by means of spectrum measurements. In particular, the Overlay System uses the resulting gaps in the frequency-time domain that are temporarily left free by the licensed system.

A second type of techniques is based on a message exchange between the different communication systems for communication of either occupied or free frequency resources. For example, document EP 1 883 258 A1 describes a method of sharing radio resources between several radio communication systems, wherein each of the radio communication systems owns a respective predefined spectrum for allocating resources. Specifically, each radio communication system comprises a respective Radio Resource Management (RRM) module, which exchanges status information concerning allocated and/or free radio resources with the RRM modules of the other communication systems. Knowing the frequency usage of the other communication modules, the RRM modules are able to allocate the radio resources. In this way, efficient cooperative spectrum sharing may be achieved without relying on "in the air" measurements.

Object and Summary of the Invention

The inventors have noted that both spectrum measurements, as shown e.g. in Ulrich Berthold et al. "Guidelines for Designing OFDM Overlay Systems", and information exchange between RRM modules, as shown e.g. in EP 1 883 258 A1, may introduce a significant latency, which may be unacceptable for communication systems having very short TTI, such as HSPA or LTE.

Moreover, the inventors have noted that prior art solutions use a very conservative frequency management, wherein the frequency spectra, which may be used simultaneously, are separated strictly in order to avoid interference between the communication systems.

The object of the invention is thus to provide, within the context considered in the foregoing, an efficient technique for operating different communication systems in the same frequency band thus improving spectral efficiency.

According to the present invention, that object is achieved by means of a method having the features set forth in the claims that follow. The invention also relates to corresponding transmission system as well as a related signal and a computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

In an embodiment, the communication systems operating in the same frequency band adopt as transmission methods spread spectrum and multi-carrier transmission, respectively.

As used herein, the designation "spread spectrum" covers all those transmission techniques where a signal generated in a particular bandwidth is deliberately spread in a frequency domain, resulting in a signal with a wider bandwidth. These techniques are used for a variety of reasons and in particular for their natural resistance to co-channel interference and jamming. Examples of spread spectrum techniques include the CDMA technique and the Frequency Hopping (FH) technique.

Multi-carrier transmission is a method where data being transmitted are split over several narrowband subcarriers. The individual subcarriers have narrow bandwidths, while the composite signal has broader bandwidth. This technique is used for its resistance to multipath propagation and allows a flexible management of the transmission resources in the frequency domain. Examples of multi-carrier techniques include OFDM, SC-FDMA and DMT (Discrete MultiTone).

Various embodiments described in the following refer, merely by way of example, to HSPA and the LTE communication systems, which are based on the CDMA and the OFDM/SC-FDMA transmission techniques, respectively.

However, the same concepts are also applicable to other communication systems based respectively on spread spectrum and multi-carrier transmission techniques.

An embodiment of the arrangement described herein relates to techniques for permitting the coexistence of the HSPA and LTE technologies in the same frequency band by exploiting certain characteristics of these communication systems.

Within the context of the arrangement described herein, the Code Division Multiple Access (CDMA) technique may be very resistant to co-channel interference; in fact, the CDMA multiple access technique used by HSPA is usually very resistant to frequency localized interfering signals, because their power is reduced SF times after the de-spreading operation, where SF is the spreading factor (e.g. SF=16 for HSDPA).

Also, still within the context of the arrangement described herein, the OFDMA and SC-FDMA techniques are not only flexible in terms of channel bandwidth, but provide also a granular allocation of the spectrum resources within the channel band to the different users; in particular, in the case of the LTE system, the channel band can be divided into so called Physical Resource Blocks (PRBs), wherein each PRB may be composed of 12 adjacent subcarriers that correspond to an elementary chunk of 180 kHz. The PRB is the elementary resource in the frequency domain that may be allocated by the scheduler to a given user both in downlink and in uplink.

In certain embodiments of the arrangement described herein, the number of PRBs that may be allocated by the scheduler, denominated usually as $N_{RB}$, may range e.g. from $N_{RB-min}$=6 to $N_{RB-max}$=110 depending on the channel bandwidth. Moreover, a PRB may extend over 6 or 7 OFDMA/SC-FDMA symbols in the time domain depending on the length of the Cyclic Prefix (CP) used for transmission.

In an embodiment, the behavior described in the foregoing is used to exploit the transition bands of the HSPA spectrum where the power spectral density decreases from a maximum value to a predefined minimum value. In particular, considering the frequency interval between the 3 dB cutoff frequency and the edge of the HSPA channel, the HSPA transition band at each spectrum side has an extension of (5−3.84)/2=0.58 [MHz], which may be used by a second wireless system that coexists with HSPA in the same frequency band. The two transition bands of each HSPA carrier can be denoted as inner transition band and outer transition band, respectively. The outer transition band is the one near to the boundary of the frequency interval that is assigned to the HSPA system and to the other communication systems that coexists with HSPA. On the contrary, the inner transition band of the HSPA carrier is the one which is far away from the boundary of such allocated frequency interval.

In certain embodiments of the arrangement described herein, LTE may be an attractive candidate for filling these transition bands, because as mentioned in the foregoing, the LTE system has the flexibility to fill a transmission spectrum with a granularity of 180 kHz corresponding to one PRB.

Another characteristic of the LTE system is that the frame and Transmission Time Interval (TTI) periods are harmonized with those of HSPA. In particular, the frame duration is equal to 10 ms for both HSPA and LTE, while the TTI period is equal to 1 ms for LTE compared with the 2 ms of HSPA. Also the sampling frequency of the baseband (BB) signals may be harmonized: for HSPA the baseband signal is sampled at 3.84 MHz while for LTE the baseband sampling frequency is equal to (n/m)×3.84 MHz, where n and m are integer factors that depend on the LTE channel bandwidth.

This behavior may be exploited in certain embodiments of the arrangement described herein to synchronize the access to the transmission medium for the two systems.

In an embodiment, the scheduling operation of the two systems is synchronized in order to minimize the cross-interference between the two systems.

In an embodiment, a multi-system joint scheduler is used for managing the assignment of the time-frequency transmission resources among the two systems in a coordinated way.

In an embodiment, the fixed relationship between the baseband sampling frequency of the HSPA and LTE systems is exploited for reducing the costs and the complexity of the transmission/reception equipments.

In an embodiment, the HSPA and LTE signals, generated at baseband level, are over-sampled in order to bring them to the same sampling frequency $F_s$ (for example $F_s$=16×3.84 MHz).

In an embodiment, the two signals are then summed at digital level, converted from digital to analog, up-converted to the radio frequency and amplified by a single PA. In this way only one analog transmitter/transceiver and one PA are required.

BRIEF DESCRIPTION OF THE ANNEXED DRAWINGS

The invention will now be described, by way of example only, with reference to the enclosed figures of drawing, wherein:

FIGS. 1 and 2 have already been discussed in the foregoing;

FIG. 3 shows an exemplary communication scenario, wherein the HSPA and LTE systems share a common 20 MHz frequency band, FIG. 4 shows an exemplary frequency spectrum of an HSPA carrier, FIGS. 5 and 6 show exemplary frequency spectra for the communication scenario shown in FIG. 3, FIGS. 7 to 10 show block diagrams of possible embodiments of HSPA and LTE transmission systems, FIG. 11 is a flow chart showing a procedure for reallocating HSPA carriers, and FIGS. 12 to 14 show further possible communication scenarios.

DETAILED DESCRIPTION OF PREFERRED EMBODIMENTS OF THE INVENTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Also, while reference will be made throughout this description primarily to HSPA and LTE systems, those of skill in the art will appreciate that no specific limitations are made to any specific communication system. In fact, the mechanisms disclosed herein may be used i.a. in any communication scenario wherein a CDMA based communication system and an OFDM based communication system should coexist in at least partially overlapping frequency bands.

As mentioned already in the foregoing, HSPA and LTE systems are expected to operate on separate frequency bands that are spaced apart depending on the spectrum resources that will be licensed for the LTE system by the regulatory bodies. In certain embodiments of this disclosure, HSPA and LTE may coexist in the same frequency band.

In the following, an exemplary embodiment will be described, wherein two continuous bands of 20 MHz are licensed to a cellular operator for downlink and uplink, respectively. Such a configuration is usually used with FDD duplexing. However, other spectrum configurations are possible without departing from the scope of the invention.

FIG. 3 shows a possible spectrum configuration with two HSPA uplink carriers $HSPA_{U1}$ and $HSPA_{U2}$ located at the boundaries of a first 20 MHz band and the LTE uplink carrier $LTE_U$ located in the middle of the band. Similarly, two HSPA downlink carriers $HSPA_{D1}$ and $HSPA_{D2}$ are located at the boundaries of a second 20 MHz band and the LTE downlink carrier $LTE_D$ is located again in the middle.

In the exemplary scenario shown in FIG. 3, a single Node B 30 is used that supports both HSPA and LTE.

As mentioned in the foregoing, the LTE system may exploit the transition bands of the HSPA spectrum. In this way, the spectral efficiency may be increased with respect to an LTE system that operates e.g. in an independent 10 MHz band.

FIG. 4 shows an exemplary power spectrum PS of a HSPA carrier in relation to the frequency f. The signal transmitted by both the HSDPA base station or by the HSUPA user equipment may be filtered, at baseband level, e.g. by means of a Root Raised Cosine filter with a 3 dB bandwidth of 3.84 MHz and roll-off $\alpha$=0.22. Specifically, line SP2 shows an exemplary HSDPA spectrum before the non linear power amplification and line SP1 shows an exemplary HSPA spectrum, which passed also through a non linear Power Amplifier (PA), which produces a sidelobe re-growth.

The HSPA spectrum considered herein exhibits transition bands TR at the two sides of the spectrum, where the power spectral density decreases from a maximum value to a predefined minimum value. For example, considering the frequency interval between the 3 dB cutoff frequency and the edge of the HSPA channel, the power spectral density decreases from a value of −3 dB to less than −30 dB (e.g. approximately −40 dB).

This behavior may be used in certain embodiments of this disclosure to allocate a number of additional PRBs in these transition bands TR of the HSPA spectrum. Thus, the aggregate throughput provided by the LTE carrier may be increased with a minimal impact in terms of interference created on the HSPA carriers.

FIG. 5 shows in that respect an exemplary spectrum allocation for the scenario shown in FIG. 3, wherein both the spectrum of the HSPA carriers $SP_{HSPA}$ and the spectrum of the LTE carrier $SP_{LTE}$ are shown. Specifically, N additional PRBs are allocated in the outer transition bands of each HSPA carrier and M additional PRBs are allocated in the inner transition bands of each HSPA carrier.

When the LTE system is deployed over a 10 MHz band, it may employ an Inverse Fast Fourier Transformation (IFFT) size equal to 1024 that corresponds to a maximum number of usable PRBs equal to $N_{RB}$=50.

With the spectrum allocation disclosed herein, the number of PRBs that may be allocated is increased to $N_{RB}$=50+2×(M+N). For that purpose, an IFFT with 2048 points may be used and which allows to use up to 20 MHz or 110 PRBs.

In an embodiment, the LTE system exploits the full 20 MHz band in those TTI intervals that are not scheduled for HSDPA transmission.

FIG. 6 shows an exemplary transmission spectrum of the LTE spectrum $SP_{LTE}$ and a HSPA spectrum $SP_{HSPA}$. In this case, the HSDPA carriers are assumed unloaded (i.e. no data are transmitted) and thus only the common channels are transmitted that correspond to about 10% to 20% of the nominal HSDPA carrier power (i.e. 33 to 36 dBm).

In that way, the LTE system can use the full 20 MHz band, even though some interference may be introduced by the HSDPA common channels in the central part of the HSDPA spectrum.

In an embodiment, HSPA transmission can be switched off temporarily in order to reduce the interference produced by the HSPA common channels. In this way, the LTE throughput may be further increased.

FIGS. 7a and 7b show exemplary transmitters of a HSPA Node B 10 and an E-UTRAN Node B 20.

Specifically, the HSDPA Node B 10 may receive through a Iub interface Iub_IF data from the Radio Network Controller (RNC). The data can be buffered by the Medium Access Control (MAC) layer that may perform also the scheduling operation and the selection of the transport format for transmission. In case of HSDPA, the MAC layer is usually denoted MAC-hs.

The transport format of HSDPA is mainly determined on the basis of the channel quality feedback (CQI) received from the user equipments. The data to be transmitted are then subject to the physical layer (L1) signal processing operations. Generally, the L1 operations may be divided into symbol level operations (e.g. channel coding, rate matching, H-ARQ, interleaving and modulation), which are usually performed by an outer modem, and chip level operations (e.g. spreading, scrambling), which are performed by an inner modem.

In an exemplary embodiment with two carriers, the HSDPA Node-B 10 may thus comprise a pair of MAC-hs (Medium Access Control-high speed) $102_1$ and $102_2$, one for each HDSPA carrier $HSPA_{D1}$ and $HSPA_{D2}$, respectively. Similarly, the HSDPA Node-B 10 may comprises two L1 physical layer modules $110_1$ and $110_2$, which in turn may comprise outer modems $112_1$ and $112_2$ and inner modems $114_1$ and $114_2$, respectively.

In the exemplary case of two adjacent carriers licensed to a given operator, the baseband signals of the second HSDPA carrier may be subject to a frequency shift of 5 MHz and may be summed to the baseband signals of the first HSDPA carrier in a block 120.

The composite signal may then be subject to over-sampling and low pass filtering (LPF) in a block 130, to digital to analog conversion (D/A) in a block 132, and to frequency up-conversion and RF filtering in a block 134.

Finally, the resulting RF signal may be amplified by a power amplifier 136 before the signal is radiated by a transmission antenna $TX_{HSPA}$.

A respective LTE transmitter for an E-Node B 20 is shown in FIG. 7b. Specifically, data may be received in an E-Node B from a Serving Gateway (SGW) through a S1 interface. The data may then be provided to a module 202, which implements the higher protocol layers that are resident in the E-Node B. These protocols may include on the control plane the Radio Resource Control, which may perform several functions such as security control, mobility handling (e.g. handover, cell selection and reselection), UE measurement control and reporting. The protocols on the user plane may include the Packet Data Convergence Protocol (PDCP), Radio Link Control (RLC) and Medium Access Control (MAC), which is responsible for the scheduling operations and thus may control the assignment of the PRB on the allocated channel band.

The data coming from the module 202 may then be provided to a module 210 that performs the baseband L1 processing operations. For example, an outer modem 212 may perform a channel coding operation, rate matching, H-ARQ processing, interleaving and modulation. Subsequently, the modulated symbols may be mapped onto the PRBs by a block 214 and the OFDM symbols may be converted from the frequency to the time domain in a block 216, which may perform e.g. an IFFT operation and subsequent parallel to serial conversion. For example, in case of a 10 MHz channel bandwidth, the IFFT size may be equal to 1024. The module 210 may also comprise a block 218 for introducing a cyclic prefix (CP) at the beginning of the OFDM symbol.

Finally, the baseband signal may be over-sampled and low-pass filtered in a block 230, and converted from digital to analog by a digital to analog converter 232. The analog signal may then be up-converted to radio frequency and filtered in a block 234, before the RF signal may be amplified in a power amplifier 236 and radiated by a transmission antenna $TX_{LTE}$.

The spectrum allocation on separate frequency bands may involve a duplication of the RF components (e.g. the power amplifiers, filters and transceivers), which may have a significant impact on the deployment costs for a cellular operator. The same considerations hold also for the uplink where the radiofrequency part (e.g. low noise amplifiers, filters and transceivers) need to be duplicated for the two systems. The impact on the costs may be even more severe in case MIMO techniques are used, because the number of transceivers and power amplifiers becomes two or even four in case of LTE system.

In order to reduce cost, a Node B 30 may be used that supports both HSPA and LTE. Specifically, the integration at physical layer level of the two systems may be simplified by the fixed relation that exists between the sampling frequency of the HSPA and LTE baseband signals. In fact, the HSPA baseband signal is sampled at 3.84 MHz, while the LTE baseband sampling frequency is equal to (n/m)×3.84 MHz, where n and m are integer factors that depend on the LTE channel bandwidth. For example, in the case of a 20 MHz LTE system the values of n and m may be 8 and 1, respectively.

FIG. 8 shows a possible embodiment of a multi-system Node B 30 that integrates at physical layer level the HSPA and LTE functionalities of the downlink radio frequency frontend.

In the embodiment shown in FIG. 8, both the HSPA and the LTE signals are generated at baseband level as described already in the foregoing with respect to FIG. 7. The baseband signals are then over-sampled in blocks 130 and 230, respectively, in order to bring them to the same sampling frequency $F_s$ (for example $F_s$=32×3.84 MHz). The two signals may then be summed at digital level in a block 340, converted from digital to analog in a common digital to analog converter 332, up-converted to the radio frequency in a block 334, amplified by a single power amplifier 336 and radiated by a common transmission antenna TX.

Thus, only one analog transceiver and only one PA are required for the two systems.

FIG. 9 shows an embodiment of a multi-system Node B 40 which supports also MIMO communication over two transmission antennas $TX_1$ and $TX_2$.

Specifically, the left side of FIG. 9 shows the baseband processing unit of the HSPA portion of the multi-system Node B 40, which generates two spatial streams.

In an embodiment, data received from the MAC-hs modules $102_1$ and $102_2$ is first subjected to the operations performed by the outer modems $112_1$ and $112_2$ (e.g. channel encoding, rate matching, interleaving) and subsequently processed by respective spatial processing units $402_1$ and $402_2$, wherein each of the spatial processing units $402_1$ and $402_2$ generates two spatial streams. Specifically, the spatial processing units $402_1$ and $402_2$ may implement operations such as space-time coding (STC), closed loop transmit diversity (CLTD) and/or spatial multiplexing (SM).

In the exemplary embodiment shown in FIG. 9, each of the two inner modems $114_1$ and $114_2$ of the HSPA baseband processing units generate thus two spatial streams for each HSDPA carrier, which may be combined to two baseband spatial streams in block 120.

Similarly, the right side of FIG. 9 shows the baseband processing unit of the LTE portion of the multi-system Node B 40.

In an embodiment, the module 202 transfers to the layer 1 two information streams, also denoted as codewords in the 3GPP standard, that are separately processed.

Specifically, each information stream is processed by a respective outer modem 212 before the two spatial streams are processed by a spatial processing unit 404. Specifically, the spatial processing units 404 may implement operations such as Space-Frequency Block Coding (SFBC), precoding, Cyclic Delay Diversity (CDD), beamforming and/or spatial multiplexing (SM).

Each spatial stream may then be processed by respective blocks 214, 216 and 218, and which had already been described with respect to FIG. 7.

The spatial streams of baseband signals of the HSPA and LTE portion may then be over-sampled in blocks 130 and 230, and combined in block 340. Finally each spatial stream may separately be converted from digital to analog, up-converted to radio frequency, and amplified in respective blocks 332, 334 and 336, before the RF signals may be radiated by transmission antennas $TX_1$ and $TX_2$.

The exemplary embodiment may be extended to any number of transmission antennas.

In an embodiment, the scheduling operations between the two systems are coordinated.

In an embodiment, the coordination of the scheduling operations between the HSPA and the LTE systems is performed directly at the MAC layer on a TTI basis. Thus only a very small latency may be introduced due to the scheduling operation of the two communication systems.

FIG. 10 shows an exemplary embodiment of a multi-system Node B 40, which supports both MIMO communication and joint scheduling of the HSPA and LTE systems. Specifically, a joint scheduling module 406 may be used, which coordinates the various MAC modules $102_1$, $102_2$ and 202.

In an embodiment, the coordination of the scheduling operations is facilitated by synchronizing the operation of the two systems. In fact, both systems have the same frame period of 10 ms and have similar TTI periods. For example, the TTI period is usually 1 ms for LTE and 2 ms for HSDPA.

In an embodiment, the joint scheduling operation is coordinated in order to improve certain performance characteristics of the HSPA and/or LTE system. This may include e.g. a minimization of the inter-system interference or a maximization of the aggregated data throughput. However, no specific limitations are made to any specific performance parameter. In fact, also a set of performance parameters may be optimized jointly.

In an embodiment, HSPA users are scheduled only into specific TTIs, so that a certain number of TTIs in a frame remain unused. These TTIs may be used by the LTE system for transmission with full bandwidth. This type of scheduling is however only possible when the HSPA network is not operating at full load, while the spectrum efficiency may improve during low or medium traffic load conditions with respect to independent systems operating in separate frequency bands.

In an embodiment, the scheduling operations between the HSPA and the LTE systems is coordinated based on the knowledge of the conventional scheduling information (such as the status of the buffers within the MAC level of the HSPA and LTE systems, the priorities of the processes to be scheduled, the propagation channel conditions, the CQIs reported by the HSPA and LTE user equipments, etc.).

In an embodiment, the scheduling operation is optimized based on the knowledge of the amount of inter-system interference generated reciprocally between the HSPA and LTE systems resulting from the partial overlap of the LTE subcarriers (PRBs) with the transition bands of the HSPA system.

In the following an exemplary embodiment of a joint scheduling procedure is described, which may be used in module 406 of FIG. 10. However, similar scheduling operation may also be implemented for the embodiments shown with respect to FIGS. 7, 8 and 9.

The amount of interference generated by the LTE system on the HSPA system may depend on the number of allocated PRBs of the LTE system and the characteristics of the HSPA transmission and reception shaping filters employed in the HSPA system. According to the 3GPP standard the transmission and reception shaping filters of the W-CDMA/HSDPA system should be Raised Root Cosine filters with a roll-off factor equal to 0.22. The implementation characteristics of these shaping filters (over-sampling frequency, number of coefficients and number of quantization bits) have to be determined by the manufacturers in order to fulfill specific requirements defined by the 3GPP standard in terms of Adjacent Channel Leakage Ratio (ACLR) and Adjacent Channel Selectivity (ACS).

In an embodiment, these characteristics are used to derive a suitable relation between the numbers of additional PRBs allocated in the external and internal transition bands of each HSPA carrier and the correspondent amount of inter-system interference generated by the LTE system on one of the two HSPA carriers.

In an embodiment, the amount of interference generated by the LTE system on the first HSPA carrier $I_{LTE \rightarrow HSPA1}$ is determined as a function of the number of allocated LTE PRBs in the transition bands N and M, and the HSPA shaping filters characteristics $SFC_{HSPA1A1}$:

$$I_{LTE \rightarrow HSPA1} = f_1(M, N, SFC_{HSPA1}) \quad (1)$$

In a similar way, it is possible to derive the amount of interference generated by the LTE system on the second HSPA carrier $I_{LTE \rightarrow HSPA2}$.

Performance of a HSPA mobile terminal, such as a mobile phone or data modem, is usually dictated by the signal-to-noise-plus-interference ratio of the associated HS-DSCH channel, denoted $(C/I)_{HS-DSCH}$ in the following.

In an embodiment, the quantity $(C/I)_{HS-DSCH1}$ for the HS-DSCH channel of the first HSPA carrier is calculated as:

$$(C/I)_{HS-DSCH1} = \frac{Ec_{HS-DSCH1}}{(\hat{I}_{or1} - Ec_{HS-DSCH1}) \cdot (1-\alpha) + I_{oc} + N_0 + I_{LTE \rightarrow HSPA1}} \quad (2)$$

where $Ec_{HS-DSCH1}$ is the energy per chip received at the mobile device from the HS-DSCH of the first HSPA carrier, $\hat{I}_{or1}$ is the power spectral density of the overall signal transmitted by the first HSPA carrier measured at the mobile device, α is the orthogonality factor of the propagation channel, $I_{oc}$ is the power spectral density of all the interfering signal generated by the surrounding based stations measured at the mobile device, and $N_0$ is the thermal noise spectral density of the mobile device.

For instance, the term $(\hat{I}_{or1} - Ec_{HS-DSCH1}) \cdot (1-\alpha)$ in equation (2) may represent the amount of intra-cell interference due to the loss of orthogonality of the codes dedicated to the other users and introduced by the propagation channel, $I_{oc}$ may represent the inter-cell interference, $N_0$ may represent the effect of the thermal noise, and $I_{LTE \rightarrow HSPA1}$ may represent the contribution of the inter-system interference.

In an embodiment, the values of the parameters M and N are selected for the users at the cell edge, taking into account that the contribution of intra-cell interference (and thermal noise) can be neglected at the cell edge with respect to the inter-cell interference:

$$(\hat{I}_{or1} - Ec_{HS-DSCH1}) \cdot (1-\alpha) + N_0 << I_{oc}.$$

For instance, the values of the parameters M and N are selected so that the amount of inter-system interference $I_{LTE \rightarrow HSPA1}$ may reach up to half of the inter-cell interference value $I_{oc}$ without significantly affecting the signal-to-noise-plus-interference ratio of the HS-DSCH channel and therefore the performance of the HSPA mobile device.

In an embodiment, the values of the parameters M and N are selected for the users close to the transmitting Node B taking into account that the contribution of inter-cell interference (and thermal noise) may be neglected for users close to the transmitting Node B with respect to the intra-cell interference:

$$I_{oc} + N_0 << (\hat{I}_{or1} - Ec_{HS-DSCH1}) \cdot (1-\alpha).$$

For instance, the values of the parameters M and N are selected so that the amount of inter-system interference $I_{LTE \rightarrow HSPA1}$ may reach up to half of the intra-cell interference value $(\hat{I}_{or1} - Ec_{HS-DSCH1}) \cdot (1-\alpha)$ without significantly affecting the signal to noise plus interference ratio of the HS-DSCH and therefore the performance of the HSPA mobile device.

In an embodiment, the correspondence between the value of $I_{LTE \rightarrow HSPA1}$ and the parameters M and N are pre-computed and stored in a memory.

In an embodiment, the joint scheduler coordination uses equation (2) to determine $I_{LTE \rightarrow HSPA1}$ and the respective values of the parameters M and N, which maximize the throughput of the LTE system without affecting the performance of the HSPA system.

In an embodiment, the scheduler allocates HSPA users that are close to the Node B in the same HSPA TTIs. Similarly, HSPA users that are located at the cell edge may be allocated in other HSPA TTI. The parameters M and N can thus be selected in a more effective way.

The amount of interference generated by the HSPA system on the LTE system is usually a function of the overall power spectral density $I_{or}$ transmitted by a given HSPA carrier and the characteristics of the transmission filter of the HSPA system.

Similarly to equation (1), it is also possible to derive an expression of the inter-system interference $I_{HSPA1 \to LTE}(i)$ generated by the first HSPA carrier on the i-th PRB.

Again, the inter-system interference $I_{HSPA1 \to LTE}(i)$ may be pre-computed and stored in a suitable memory for all the different PRBs of the LTE system.

Performance of a LTE mobile device during the transmission on the i-th PRB is usually dictated by the signal-to-noise-plus-interference ratio on that particular PRB in the following denoted as $(C/I)_{PRB}(i)$ and may be expressed as:

$$(C/I)_{PRB}(i) = \frac{Ec_{PRB}(i)}{I_{oc,PRB}(i) + N_0 + I_{HSPA1 \to LTE}(i)} \quad (3)$$

where $Ec_{PRB}(i)$ is the power spectral density of the useful signal received by the mobile device on the i-th PRB and $I_{oc,PRB}(i)$ is the power spectral density of the interfering signals transmitted by the surrounding base stations and received by the mobile device on the i-th PRB.

With the information of the signal-to-noise-plus-interference ratio on the i-th PRB it is possible to compute the maximum throughput that the LTE system can achieve on the i-th PRB as a function of the number of HSPA users scheduled on the considered HSPA carrier.

However, the quantities $(C/I)_{HS-DSCH1}$ and $(C/I)_{PRB}(i)$ may not be known completely at the Node B, because the mobile devices after having measured these quantities, e.g. by means of equations (2) and (3), may report to the Node B only corresponding indicators, such as Channel Quality Indicators (CQI), which are merely proportional to the measured $(C/I)_{HS-DSCH1}$ on the HSPA system for the CQI-HSPA and the $(C/I)_{PRB}(i)$ measured on the i-th PRB of the LTE system for the CQI-LTE(i).

In an embodiment, the Node B selects therefore the parameters N and M, which optimizes an aggregated function of these CQIs. For example, the Node B may maximize the sum of all the CQI values reported by the mobile devices operating in the HSPA and LTE systems.

In an embodiment, the Radio Resource Management (RRM) algorithms of the HSPA and LTE systems cooperate in order to maximize the efficiency in the spectrum utilization.

The number of additional PRBs allocated in the transmission bands of the HSPA carriers do not necessarily have to be equal.

Similarly, the procedures may also be applied if only a single HSPA carrier is used. For example, the HSPA traffic may be segregated at least temporarily on only one of the two HSPA carriers. In this way the second HSPA carrier that remains unloaded may be switched off temporarily and the correspondent spectrum may be used completely by the LTE system.

In an embodiment, also the common channels such as the Primary Common Pilot Channel (P-CPICH), the primary Synchronization Channel (pSCH), and the secondary Synchronization Channel (sSCH) are not transmitted for unloaded HSPA carriers, so that the interference generated by the HSPA system on the OFDMA system is minimized.

In an embodiment, this strategy is used when the traffic load of the HSPA network drops below a certain threshold. In such a case, HSPA users that are served by the second carrier are moved to the first HSPA carrier by means of an handover procedure controlled by the Radio Resource Control (RRC) protocols. Subsequently, the second HSPA carrier may be switched off. The second carrier may be turned on again if HSPA traffic of the first carrier rises above a second threshold.

FIG. 11 shows in that respect a flow chart of a possible scheduling mechanism, where $\eta_1$ and $\eta_2$ are the instantaneous traffic loads of the two HSPA carriers, while $\eta_{OFF}$ and $\eta_{ON}$ (with $\eta_{OFF} < \eta_{ON}$) are the load thresholds that trigger the activation of the proposed procedure. A similar scheduling might be implemented for all CDMA based communication systems having more than one carrier.

After a start step 1000, both HSDPA carriers are switched on during an initialization step 1002.

The carriers are then maintained active if the sum $\eta_1 + \eta_2$ of the instantaneous traffic loads of the two HSPA carriers is greater than the threshold $\eta_{OFF}$. Conversely, if the sum $\eta_1 + \eta_2$ is smaller than the threshold $\eta_{OFF}$ one of the HSPA carriers may be switched off. For example, the carrier with less traffic may be switched off, i.e. if the instantaneous traffic load $\eta_1$ of the first HSPA carrier is smaller than the instantaneous traffic load $\eta_2$ of the second carrier then the first HSPA carrier is switched off, while, if the instantaneous traffic load $\eta_2$ of the second HSPA carrier is smaller or equal than the instantaneous traffic load $\eta_1$ of the first carrier then the second HSPA carrier is switched off. This allows for reducing the amount of handover signaling required for moving the users of one HSPA carrier to the other HSPA carrier.

In the exemplary embodiment, the above cases are verified by the conditions 1004 and 1006, which verify $\eta_1 + \eta_2 < \eta_{OFF}$ and $\eta_1 < \eta_2$, respectively, and wherein a positive outcome of the verification is indicated with "Y", while a negative outcome is indicated with "N".

Specifically, if the instantaneous traffic load of both carriers is small than the shutdown threshold $\eta_{OFF}$ and $\eta_1$ is smaller than $\eta_2$ (i.e. the left branch of condition 1006 is selected) the HSPA users of the first HSPA carrier may be moved to the second carrier at a step 1010 and the first HSPA carrier may be switched off at a step 1012. Subsequently, the traffic load of the second carrier may be monitored at condition 1014, and if the instantaneous traffic $\eta_2$ exceeds the threshold $\eta_{ON}$, the first HSPA carrier may be switched on again at a step 1016 and the procedure returns to condition 1004.

Conversely, if the instantaneous traffic load of both carriers is smaller than the shutdown threshold $\eta_{OFF}$ and $\eta_1$ is at least $\eta_2$ (i.e. the right branch of condition 1006 is selected) the HSPA users of the second HSPA carrier may be moved to the first carrier at a step 1020 and the second HSPA carrier may be switched off at a step 1022. Subsequently, the traffic load of the first carrier may be monitored at condition 1024, and if the instantaneous traffic $\eta_1$ exceeds the threshold $\eta_{ON}$, the second HSPA carrier may be switched on again at a step 1026 and the procedure returns to condition 1004.

The spectrum configuration shown in FIG. 3 is just one example and other configurations are possible. For example, any number of CDMA carriers and any bandwidth may be used.

The embodiments shown in the foregoing have in common that the transition bands of a CDMA based communication system, such as UMTS/HSPA, are exploited by an OFDM based communication systems, such as LTE.

Figures 1, 2:
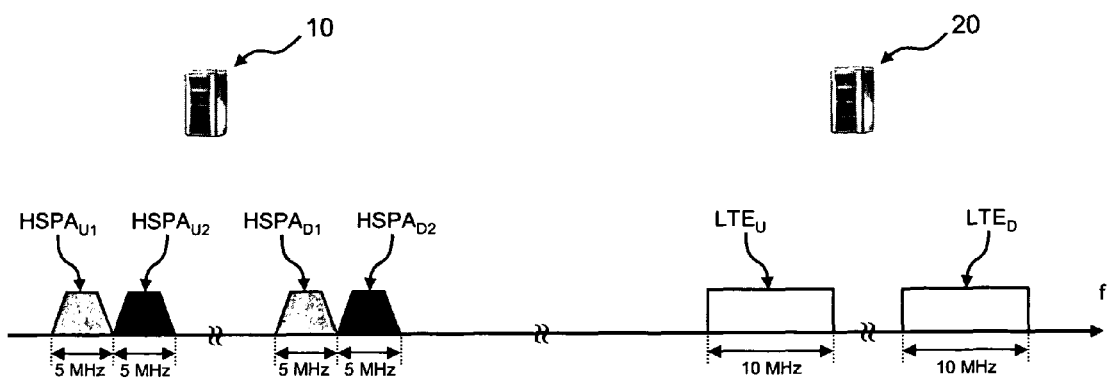
Figure 3:
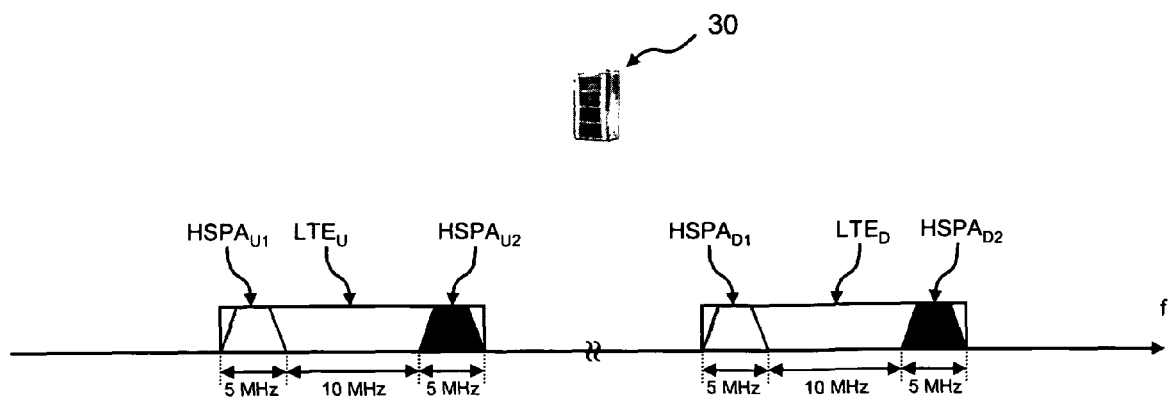
Figure 4:
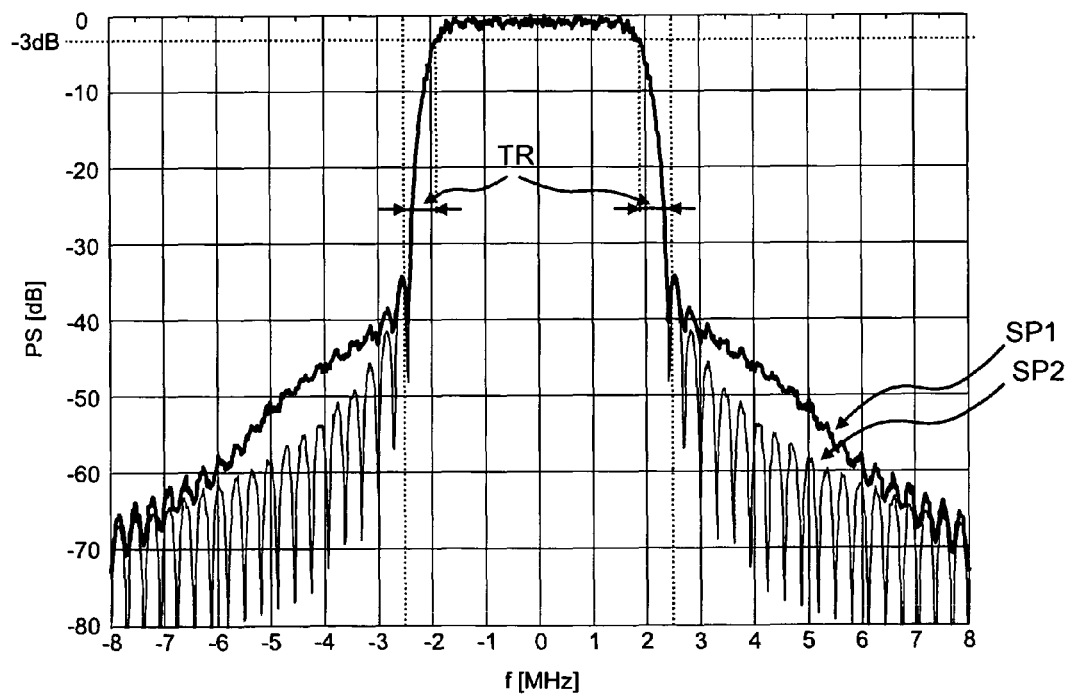
Figure 5:
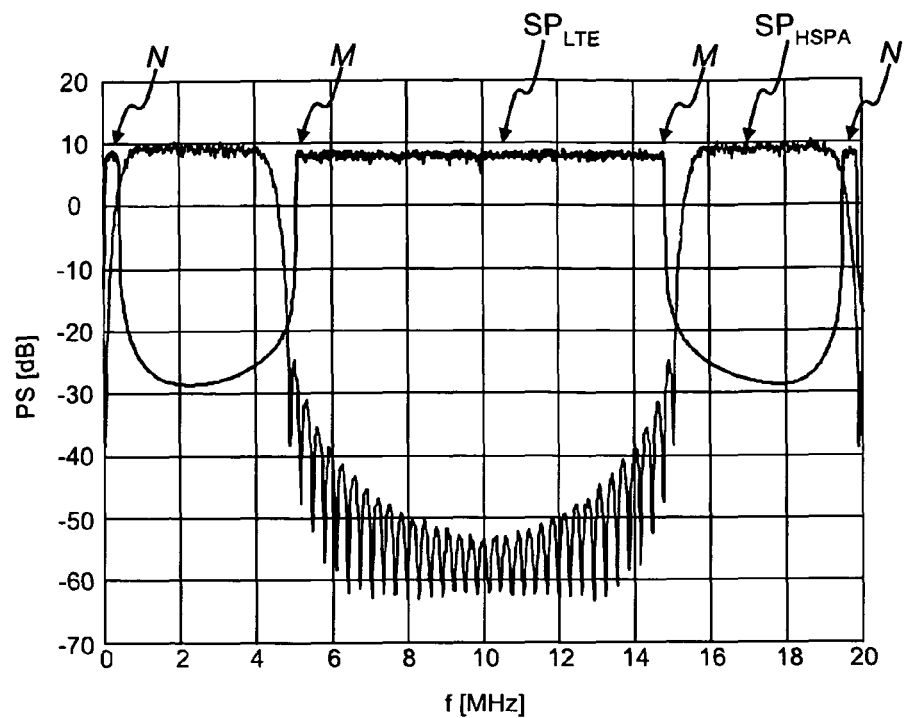
Figure 6:
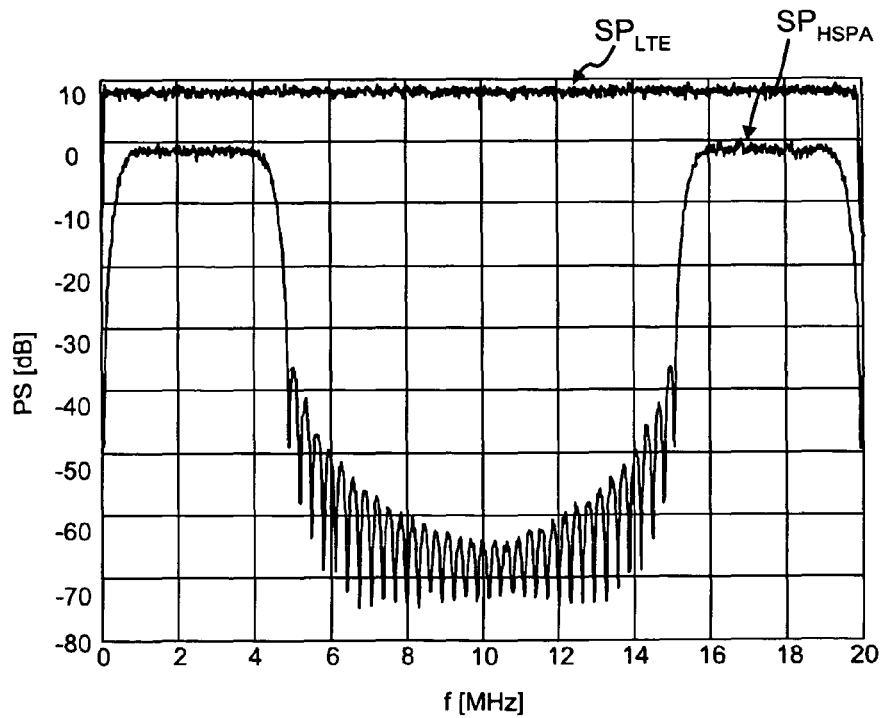
Figure 7:
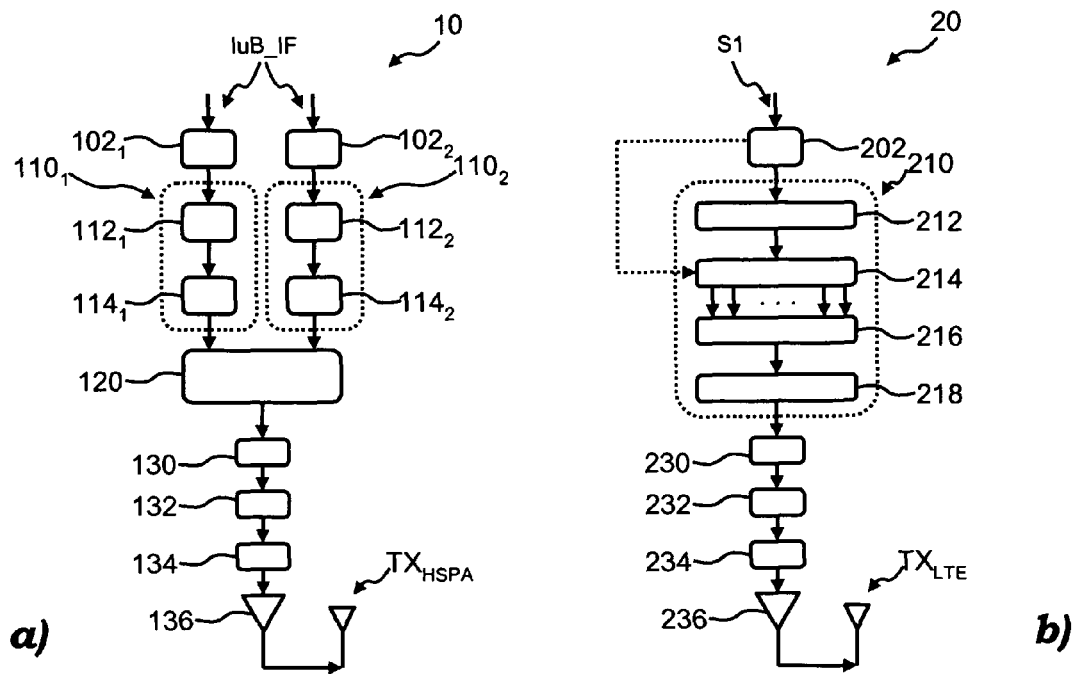
Figure 8:
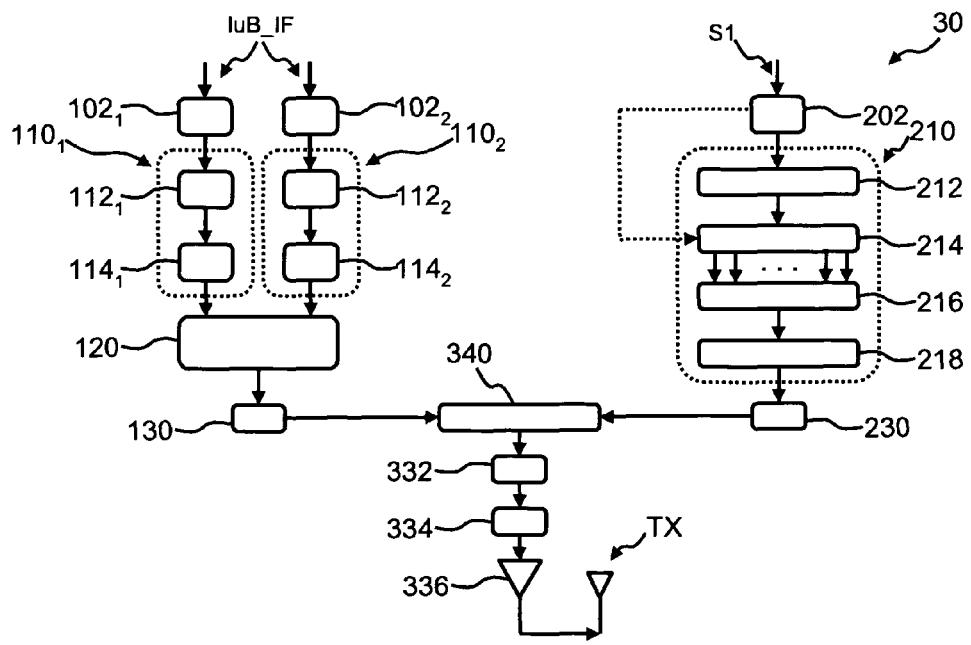
Figure 9:
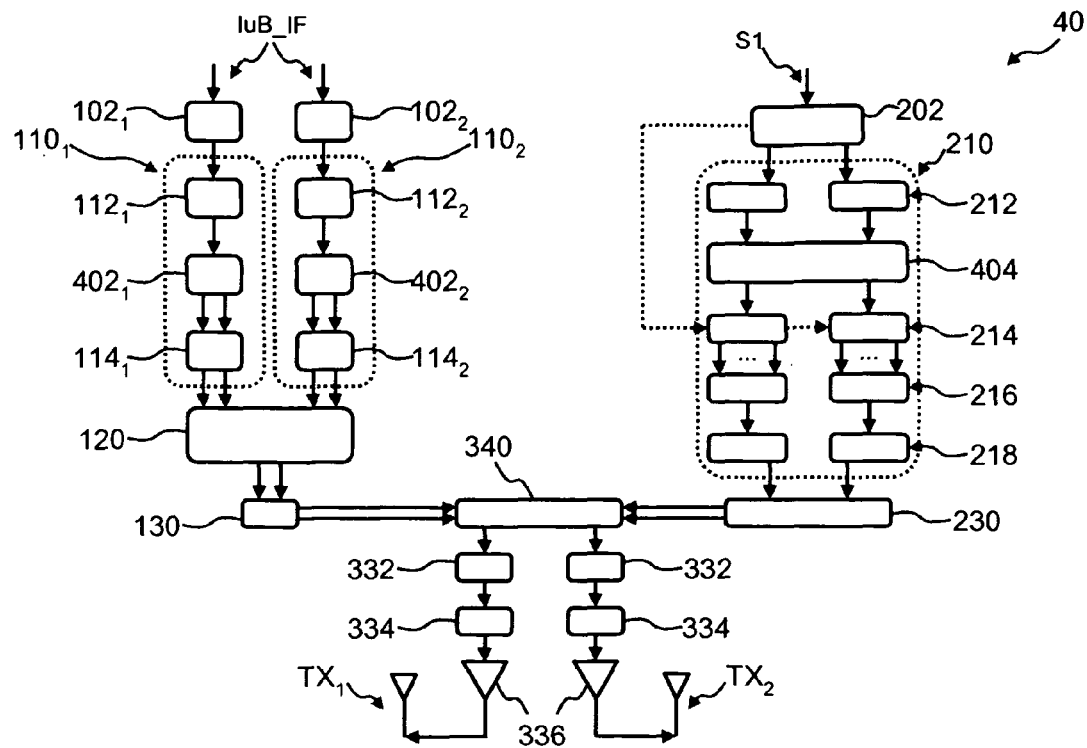
Figure 10:
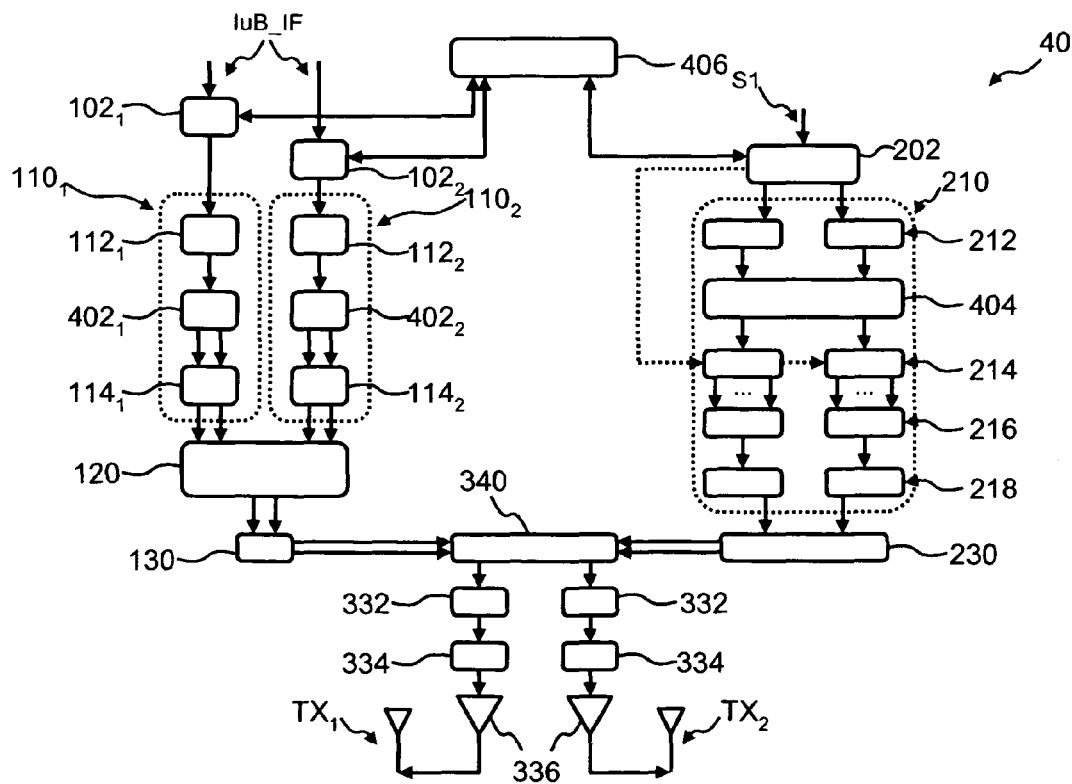
Figure 11:
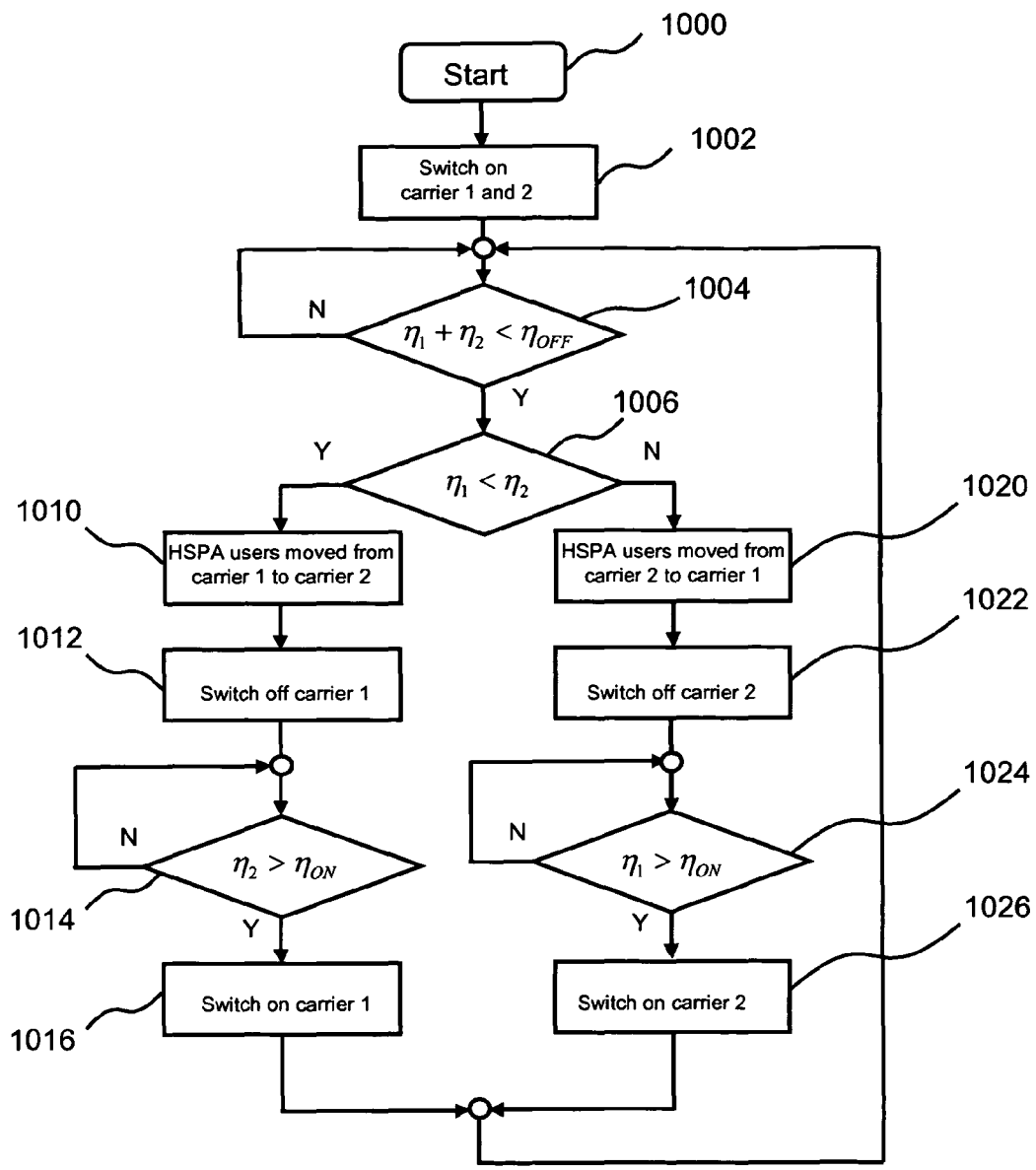
Figure 12:
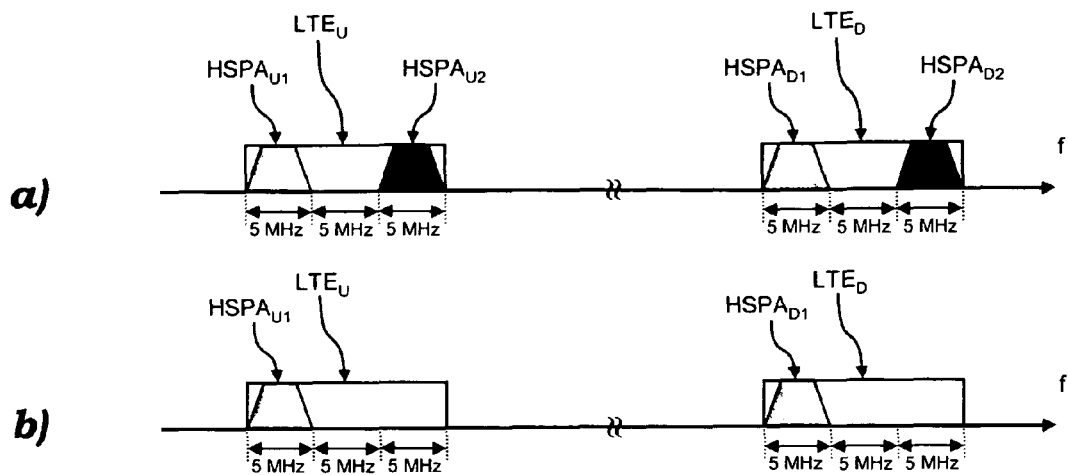
FIGS. 12a and 12b show in that respect two embodiments, wherein a 15 MHz band is used simultaneously by either two HSPA carriers or only one HSPA carrier, respectively.
Figure 13:
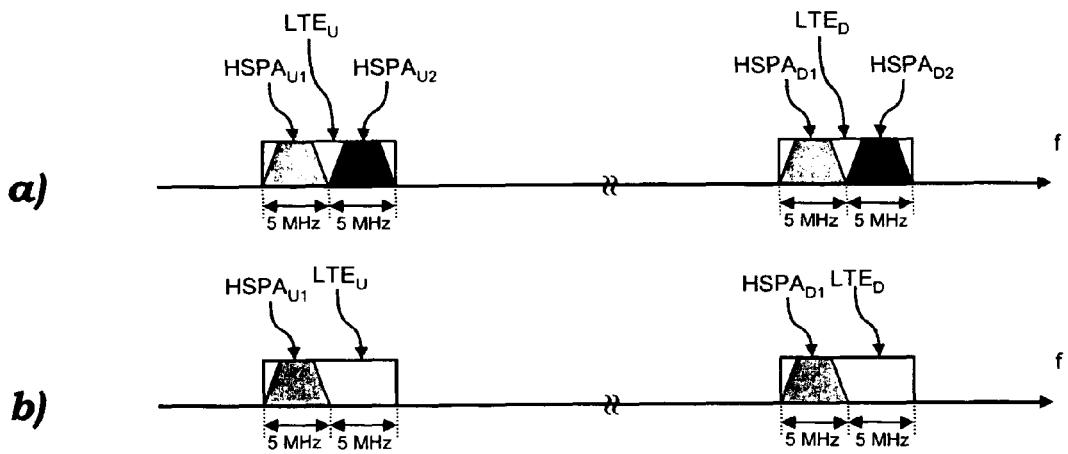
FIGS. 13a and 13b shows a spectrum configuration in case of a 10 MHz band with either two HSPA carriers or only one HSPA carrier, respectively.

In this way it is even possible to use the LTE system in a 10 MHz band, which is shared with two HSPA carriers as shown in FIG. 13a. Specifically, the LTE system transmits usually the common channels (e.g. synchronization and broadcast) in the central part of the spectrum using six PRBs centered on the DC subcarrier. For example, this part of the LTE spectrum may correspond to 6×180=1080 kHz. However, as shown in the foregoing the inner transition bands of the two HSPA carriers may be sufficient for transmitting these PRBs.

The proposed mechanism might also be used for operating a LTE system together with narrowband systems such second generation systems (for example GSM, GPRS and EDGE).

Figure 14:
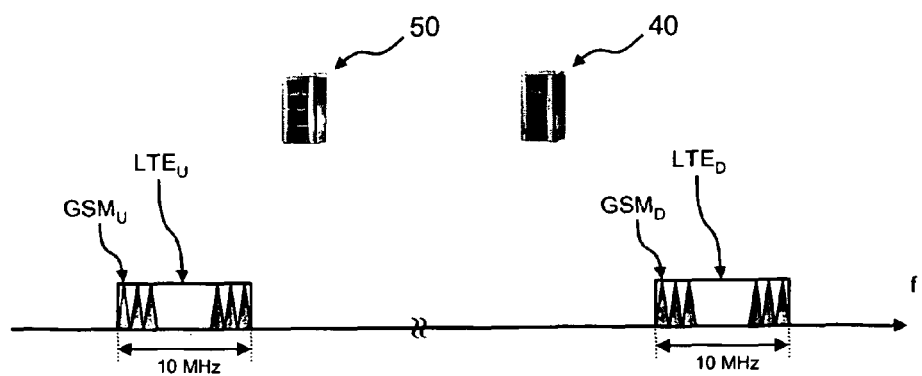

FIG. 14 shows a possible scenario, where a 10 MHz band is shared with a GSM system having at least one uplink carrier $GSM_U$ and at least one downlink carrier $GSM_D$, and which are managed by a GSM base station 50.

The embodiments shown herein facilitates therefore the gradual re-farming of already licensed frequency bands, which may be switched off progressively and, at the same time, the same spectrum may be used by the LTE system thus maximizing the spectral efficiency achieved by the cellular operator.

Without prejudice to the underlying principles of the invention, the details and the embodiments may vary, even appreciably, with respect to what has been described by way of example only, without departing from the scope of the invention as defined by the annexed claims.

The invention claimed is:

1. A method of transmitting digital signals over a communication channel having a given bandwidth, comprising:
   transmitting over said channel at least one spread spectrum signal comprising at least one code division multiple access signal, wherein a spectrum of said at least one spread spectrum signal comprises:
      a nearly flat portion wherein a power spectral density of said at least one spread spectrum signal is around a maximum value; and
      roll-off transition bands at both boundaries of said nearly flat portion wherein said power spectral density decreases from said maximum value to a predefined minimum value; and
   simultaneously transmitting over said channel a plurality of multi-carrier transmission signals over at least one of said transition bands, wherein a number of said multi-carrier transmission signals in said plurality of multi-carrier transmission signals is determined as a function of at least:
      interference generated by said multi-carrier transmission signals on said at least one spread spectrum signal; and
      interference generated by said at least one spread spectrum signals on said multi-carrier transmission signals,
   wherein said number of said multi-carrier transmission signals is selected so that an amount of said interference generated by said multi-carrier transmission signals on said at least one spread spectrum signal may reach up to a fraction of an inter-cell interference value and/or an intra-cell interference value without significantly affecting a signal-to-noise-plus-interference ratio of said at last one spread spectrum signal.

2. The method of claim 1, wherein said plurality of multi-carrier transmission signals are orthogonal frequency division multiplexing signals.

3. The method of claim 1, comprising estimating the interference generated by said multi-carrier transmission signals on said at least one spread spectrum signal based on channel quality indicators received from a plurality of users receiving said digital signals over said communication channel.

4. The method of claim 1, wherein said digital signals are transmitted to a plurality of users via at least one transmission source, and wherein the number of said multi-carrier transmission signals in said plurality of multi-carrier transmission signals is alternatively determined as a function of distances of said users from said at least one transmission source.

5. The method of claim 1, wherein said at least one spread spectrum signal and said plurality of multi-carrier transmission signals are transmitted in synchronized time intervals.

6. The method of claim 5, comprising:
   transmitting said at least one spread spectrum signal during a first set of time intervals to occupy said spectrum;
   deactivating transmission of said at least one spread spectrum signal during a second set of time intervals, whereby said spectrum is left free; and
   transmitting during said second set of time intervals said plurality of multi-carrier transmission signals in said spectrum left free by said at least one spread spectrum signal.

7. The method of claim 1, wherein said transmitting comprises transmitting a first and a second spread spectrum signal over said channel, said first spread spectrum signal being located at a lower frequency boundary of said channel and said second spread spectrum signal being located at an upper frequency boundary of said channel.

8. The method of claim 7, wherein said first and second spread spectrum signals jointly define a pair of inner transition bands there between and a pair of outer transition bands external thereto, comprising:
   transmitting at least one multi-carrier transmission signal in at least one of said inner transition bands; and
   transmitting at least one multi-carrier transmission signal in at least one of said outer transition bands.

9. The method of claim 7, comprising:
   monitoring traffic loads of said first and said second spread spectrum signals;
   deactivating the transmission of at least one of said first or said second spread spectrum signals if the accumulated traffic loads fall below a predetermined threshold, thereby leaving free a respective portion of said spectrum; and
   transmitting at least one multi-carrier transmission signal in said portion of said spectrum left free by the at least one spread spectrum signal thus deactivated.

10. The method of claim 1, wherein said at least one spread spectrum signal is a high speed packet access signal.

11. The method of claim 1, wherein said at least one multi-carrier transmission signal is a universal mobile telecommunications system long term evolution signal.

12. The method of claim 1, wherein the number of multi-carrier transmission signals in said plurality of multi-carrier transmission signals is determined by optimizing data throughput of said multi-carrier transmission signals and/or said at least one spread spectrum signal.

13. A transmission system comprising:
   a spread spectrum processing unit for generating at least one spread spectrum baseband signal;
   a multi-carrier transmission baseband processing unit for generating at least one multi-carrier transmission baseband signal; and
   at least one radio frequency front end for converting and transmitting said at least one spread spectrum baseband signal and said at least one multi-carrier transmission signal over a communication channel having a given bandwidth, wherein said transmission system is configured for:
  transmitting over said bandwidth said at least one spread spectrum signal comprising at least one code division multiple access signal, wherein a spectrum of said at least one spread spectrum signal comprises:
    a nearly flat portion wherein a power spectral density of said at least one spread spectrum signal is around a maximum value; and
    roll-off transition bands at both boundaries of said nearly flat portion wherein said power spectral density decreases from said maximum value to a predefined minimum value; and
  simultaneously transmitting over said channel a plurality of multi-carrier transmission signals over at least one of said transition bands, wherein a number of said multi-carrier transmission signals in said plurality of multi-carrier transmission signals is determined as a function of at least one of:
    interference generated by said multi-carrier transmission signals on said at least one spread spectrum signal; and
    interference generated b said at least one spread spectrum signal on said multi-carrier transmission signals,
    wherein said number of said mufti-carrier transmission signals is selected so that an amount of said interference generated by said multi-carrier transmission signals on said ,at least spread spectrum signal may reach up to a fraction of an inter cell interference value and/or an intra cell interference value without significantly affecting a signal-to-noise-plus-interference ratio of said at least one spread spectrum signal.

14. The transmission system of claim 13, comprising:
at least one oversampling unit for oversampling said at least one spread spectrum baseband signal and said at least one multi-carrier transmission signal in order to bring said at least one spread baseband signal and at least one multi-carrier transmission signal to the same sampling frequency;
a combiner for combining an oversampled spread spectrum baseband signal and an oversampled multi-carrier transmission signal; and
one radio frequency front end for converting and transmitting said combined signals over said communication channel.

15. A non-transitory computer-readable medium comprising software code portions configured to, when executed, perform a method of transmitting digital signals over a communication channel having a given bandwidth, comprising:
  transmitting over said channel at least one spread spectrum signal comprising a code division multiple access signal, wherein a spectrum of said at least one spread spectrum signal comprises:
    a nearly flat portion wherein a power spectral density of said at least one spread spectrum signal is around a maximum value; and
    roll-off transition bands at both boundaries of said nearly flat portion wherein said power spectral density decreases from said maximum value to a predefined minimum value; and
  simultaneously transmitting over said channel a plurality of multi-carrier transmission signals over at least one of said transition bands, wherein a number of said multi-carrier transmission signals in said plurality of milt-carrier transmission signals is determined as a function of at least one of:
    interference generated by said multi-carrier transmission signals on said at least one spread spectrum signal; and
    interference generated by said least one spread spectrum signal on said multi-carrier transmission signals,
    wherein said number of said multi-carrier transmission signals is selected so that an amount of said interference generated by said multi-carrier transmission signals on said least one spread spectrum signal may reach up to a fraction of an inter-cell interference value and/or an intra-cell interference value without significantly affecting a signal-noise-plus-interference ratio of said at least one spread spectrum signal.

* * * * *